United States Patent
Huang et al.

(10) Patent No.: US 9,128,719 B2
(45) Date of Patent: Sep. 8, 2015

(54) CONTROLLING CIRCUIT WITH POWER SAVING MECHANISM AND METHOD THEREOF

(75) Inventors: Liang-Wei Huang, Hsinchu (TW); Ta-Chin Tseng, New Taipei (TW); Chi-Shun Weng, Hsinchu County (TW); Shieh-Hsing Kuo, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 802 days.

(21) Appl. No.: 13/290,134

(22) Filed: Nov. 7, 2011

(65) Prior Publication Data

US 2012/0137156 A1    May 31, 2012

(30) Foreign Application Priority Data

Nov. 25, 2010   (TW) ............................... 99140721 A

(51) Int. Cl.
| | |
|---|---|
| *H04L 12/26* | (2006.01) |
| *G06F 1/32* | (2006.01) |
| *H04L 12/413* | (2006.01) |

(52) U.S. Cl.
CPC .......... *G06F 1/3278* (2013.01); *H04L 12/2602* (2013.01); *H04L 12/2692* (2013.01); *H04L 12/413* (2013.01); *H04L 43/00* (2013.01); *Y02B 60/126* (2013.01); *Y02B 60/30* (2013.01); *Y02B 60/31* (2013.01); *Y02B 60/32* (2013.01); *Y02B 60/34* (2013.01); *Y02B 60/35* (2013.01)

(58) Field of Classification Search
CPC . H04L 12/2602; H04L 12/2692; H04L 43/00; Y02B 60/30–60/35
USPC ........................................................ 713/324
See application file for complete search history.

(56) References Cited

U.S. PATENT DOCUMENTS

| | | | | |
|---|---|---|---|---|
| 7,652,483 | B2 * | 1/2010 | Huang et al. ................... | 324/534 |
| 7,835,289 | B2 * | 11/2010 | Lida et al. ...................... | 370/241 |
| 7,835,382 | B2 * | 11/2010 | Lida et al. ...................... | 370/437 |
| 8,085,858 | B2 * | 12/2011 | Lida et al. ...................... | 375/257 |
| 8,107,365 | B2 * | 1/2012 | Barrass ......................... | 370/229 |
| 8,355,327 | B2 * | 1/2013 | Lida et al. ...................... | 370/235 |
| 8,364,991 | B2 * | 1/2013 | Lida et al. ...................... | 713/320 |
| 8,538,359 | B2 | 9/2013 | Yen | |
| 8,565,105 | B2 * | 10/2013 | Diab et al. ..................... | 370/252 |
| 2008/0100304 | A1 * | 5/2008 | Huang et al. .................. | 324/534 |
| 2008/0291986 | A1 * | 11/2008 | Lida et al. ...................... | 375/222 |
| 2008/0291994 | A1 * | 11/2008 | Lida et al. ................. | 375/240.01 |
| 2008/0292007 | A1 * | 11/2008 | Lida et al. ..................... | 375/257 |

(Continued)

FOREIGN PATENT DOCUMENTS

| | | |
|---|---|---|
| CN | 1946199 A | 4/2007 |
| CN | 101873679 A | 10/2010 |

(Continued)

*Primary Examiner* — Ryan Stiglic
(74) *Attorney, Agent, or Firm* — Winston Hsu; Scott Margo

(57) ABSTRACT

A controlling circuit supporting a power saving mechanism includes: a transmitting interface arranged to perform a signal transmission with a specific controlling circuit; and a setting unit coupled to the transmitting interface. The setting unit is arranged to control the specific controlling circuit to operate in the power saving mechanism.

9 Claims, 7 Drawing Sheets

(56) References Cited

U.S. PATENT DOCUMENTS

| | | | |
|---|---|---|---|
| 2008/0294919 A1* | 11/2008 | Lida et al. | 713/320 |
| 2008/0301748 A1* | 12/2008 | Lida et al. | 725/121 |
| 2008/0304433 A1* | 12/2008 | Lida et al. | 370/311 |
| 2009/0074040 A1* | 3/2009 | Lida et al. | 375/220 |
| 2010/0023085 A1 | 1/2010 | Wu | |
| 2010/0080111 A1* | 4/2010 | Diab et al. | 370/201 |
| 2010/0115316 A1* | 5/2010 | Diab | 713/323 |
| 2010/0128738 A1* | 5/2010 | Barrass | 370/445 |
| 2010/0262851 A1* | 10/2010 | Chien | 713/320 |
| 2010/0322078 A1* | 12/2010 | Wang et al. | 370/241 |

FOREIGN PATENT DOCUMENTS

| | | |
|---|---|---|
| TW | 342960 | 10/1998 |
| TW | 461204 | 10/2001 |
| TW | I235558 | 7/2005 |
| TW | M340671 | 9/2008 |
| TW | 200847602 | 12/2008 |
| TW | I328333 | 8/2010 |
| TW | 201035741 | 10/2010 |
| TW | M390614 | 10/2010 |
| TW | 201039662 | 11/2010 |

\* cited by examiner

CONTROLLING CIRCUIT WITH POWER SAVING MECHANISM AND METHOD THEREOF

BACKGROUND

1. Technical Field

The disclosure relates to a controlling circuit with a power saving mechanism and an erroneous wake-up preventing mechanism and method thereof.

2. Description of the Prior Art

For current physical layers, data rates of a network connection have increased from 10 Mb/s to 100 Mb/s and 1000 Mb/s. In order to have downward compatibility with previous data rates, IEEE (Institute of Electrical and Electronics Engineers) standard 802.3-2005 supports three data rates (10 Mb/s, 100 Mb/s and 1000 Mb/s). Before two Ethernet physical layers are linked, an auto-negotiation is processed to confirm the highest data rate supported by these two Ethernet physical layers, and then the two Ethernet physical layers try to establish a link at this highest data rate. In addition, the IEEE 802.3az Energy Efficient Ethernet (EEE) standard provides a standard procedure to save the power of a network device when the Ethernet is in the Idle Mode. Conventionally, the two network devices have to perform the process of auto-negotiation to confirm if both network devices conform to the IEEE 802.3az EEE standard; however, most network devices do not support this auto-negotiation capability.

In a data transmitting system, when a first application circuit is linked to a second application circuit via a data transmitting medium, the first application circuit does not always exchange data with the second application circuit. For example, the first application circuit may continuously receive data from the second application circuit and does not transmit data to the second application circuit in a specific time interval, or no data is transferred between the first application circuit and the second application circuit. More specifically, when a transmitter of the first application circuit does not transmit data to the second application circuit, the transmitter of the first application circuit should stay in a low power consumption mode, or when a receiver of the first application circuit does not receive data from the second application circuit, the receiver of the first application circuit should stay in a low power consumption mode. Furthermore, when the data capacity transferring between the first application circuit and the second application circuit is small, the first application circuit and the second application circuit may also be operated in the low power consumption mode, e.g., a low data rate mode. The power saving mechanism of the first application circuit may differ from the power saving mechanism of the second application circuit, or only one application circuit has the power saving mechanism. In these situations, when one of the application circuits (e.g., the first application circuit) satisfies the condition to enter the low power consumption mode (e.g., the first application circuit does not receive data), the receiver of the first application circuit may not be able to enter the low power consumption mode due to the lack of a standard operating procedure for the first application circuit and the second application circuit.

In addition, when both receivers of the first application circuit and the second application circuit are operated in the low power consumption mode (e.g., a sleep mode), and when the receiver of the first application circuit transmits a triggering signal to the receiver of the second application circuit via the data transmitting medium to wake up the receiver of the second application circuit from the sleep mode, an echo may be reflected to the receiver of the first application circuit. The receiver of the first application circuit may also be woken up from the sleep mode by the echo. In other words, the receiver of the first application circuit is erroneously woken up, which means an error may occur in the data transmitting system. Therefore, providing a standard power saving mechanism for the data transmitting system to save the power of the network device, and providing a wakening mechanism to properly wake up a network device from the low power consumption mode is a significant concern in the communication system field.

BRIEF SUMMARY

One of the objectives of the disclosure is to therefore provide a controlling circuit a method thereof for applying a power saving mechanism into another controlling circuit, the controlling circuit having an erroneous wake-up preventing mechanism.

According to a first embodiment, a controlling circuit supporting a power saving mechanism is disclosed. The controlling circuit comprises a transmitting interface and a setting unit. The transmitting interface is arranged to perform a signal transmission with a specific controlling circuit. The setting unit is coupled to the transmitting interface, and is arranged to control the specific controlling circuit to operate in the power saving mechanism.

According to a second embodiment, a controlling circuit linking to a specific controlling circuit is disclosed. The controlling circuit comprises a receiver and an adjusting circuit. The receiver is arranged to receive an input signal. The adjusting circuit is coupled to the receiver. When the controlling circuit and the specific controlling circuit enter a Low Power Idle (LPI) mode, the adjusting circuit adjusts an input signal threshold value of the receiver into a second threshold value from a first threshold value, and when a signal strength of the input signal reaches the second threshold value, the receiver regards the input signal as a valid input signal.

According to a third embodiment, a controlling circuit linking to a specific controlling circuit is disclosed. The controlling circuit comprises a filtering circuit and an adjusting circuit. The filtering circuit is arranged to perform a filtering operation upon an input signal received by the controlling circuit. The adjusting circuit is coupled to the filtering circuit, and arranged to adjust a cut-off frequency of the filtering circuit into a second threshold frequency from a first threshold frequency before both controlling circuit and the specific controlling circuit enter a Low Power Idle (LPI) mode, wherein when a signal frequency of the input signal reaches the second threshold frequency, the controlling circuit regards the input signal as a valid input signal.

According to a fourth embodiment, a controlling circuit is disclosed. The controlling circuit comprises a receiver, an input signal detecting circuit, and an echo cancellation circuit. The receiver is arranged to receive an input signal. The input signal detecting circuit is arranged to detect if the input signal is a valid input signal. The echo cancellation circuit is coupled between the receiver and input signal detecting circuit, and arranged to perform an echo cancellation operation, wherein the echo cancellation circuit transmits the input signal to the input signal detecting circuit after performing the echo cancellation operation upon the input signal.

According to a fifth embodiment, a controlling circuit is disclosed. The controlling circuit comprises a receiver and a determining circuit. The receiver is arranged to receive an input signal. The determining circuit is coupled to the receiver, and arranged to determine if a signal frequency of the input signal reaches a predetermined frequency, wherein if the signal frequency does not reach the predetermined frequency, the determining circuit determines that the input signal is a valid input signal, and if the signal frequency reaches the predetermined frequency, the determining circuit determines that the input signal is not a valid input signal.

According to a sixth embodiment, a controlling method is disclosed. The controlling method comprises: arranging a controlling circuit having a receiver to link to a specific controlling circuit; using the receiver to receive an input signal from the specific controlling circuit; and when the controlling circuit and the specific controlling circuit enter a Low Power Idle (LPI) mode, adjusting an input signal threshold value of the receiver into a second threshold value from a first threshold value, and when a signal strength of the input signal reaches the second threshold value, regarding the input signal as a valid input signal of the receiver.

According to a seventh embodiment, a controlling method is disclosed. The controlling method comprises: linking a controlling circuit to a specific controlling circuit; using a filtering circuit to perform a filtering operation upon an input signal received by the controlling circuit, wherein the input signal is generated from the specific controlling circuit; and adjusting a cut-off frequency of the filtering circuit into a second threshold frequency from a first threshold frequency before both controlling circuit and the specific controlling circuit enter a Low Power Idle (LPI) mode, wherein when a signal frequency of the input signal reaches the second threshold frequency, regarding the input signal as a valid input signal of the controlling circuit.

According to an eighth embodiment, a controlling method is disclosed. The controlling method comprises: receiving an input signal; detecting if the input signal is a valid input signal; and determining if the input signal is the valid input signal after using an echo cancellation circuit to perform an echo cancellation operation upon the input signal.

According to a ninth embodiment, a controlling method is disclosed. The controlling method comprises: receiving an input signal; and determining if a signal frequency of the input signal reaches a predetermined frequency, wherein if the signal frequency does not reach the predetermined frequency, determining that the input signal is a valid input signal, and if the signal frequency reaches the predetermined frequency, determining that the input signal is not a valid input signal.

These and other objectives of the disclosure will no doubt become obvious to those of ordinary skill in the art after reading the following detailed description of the embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
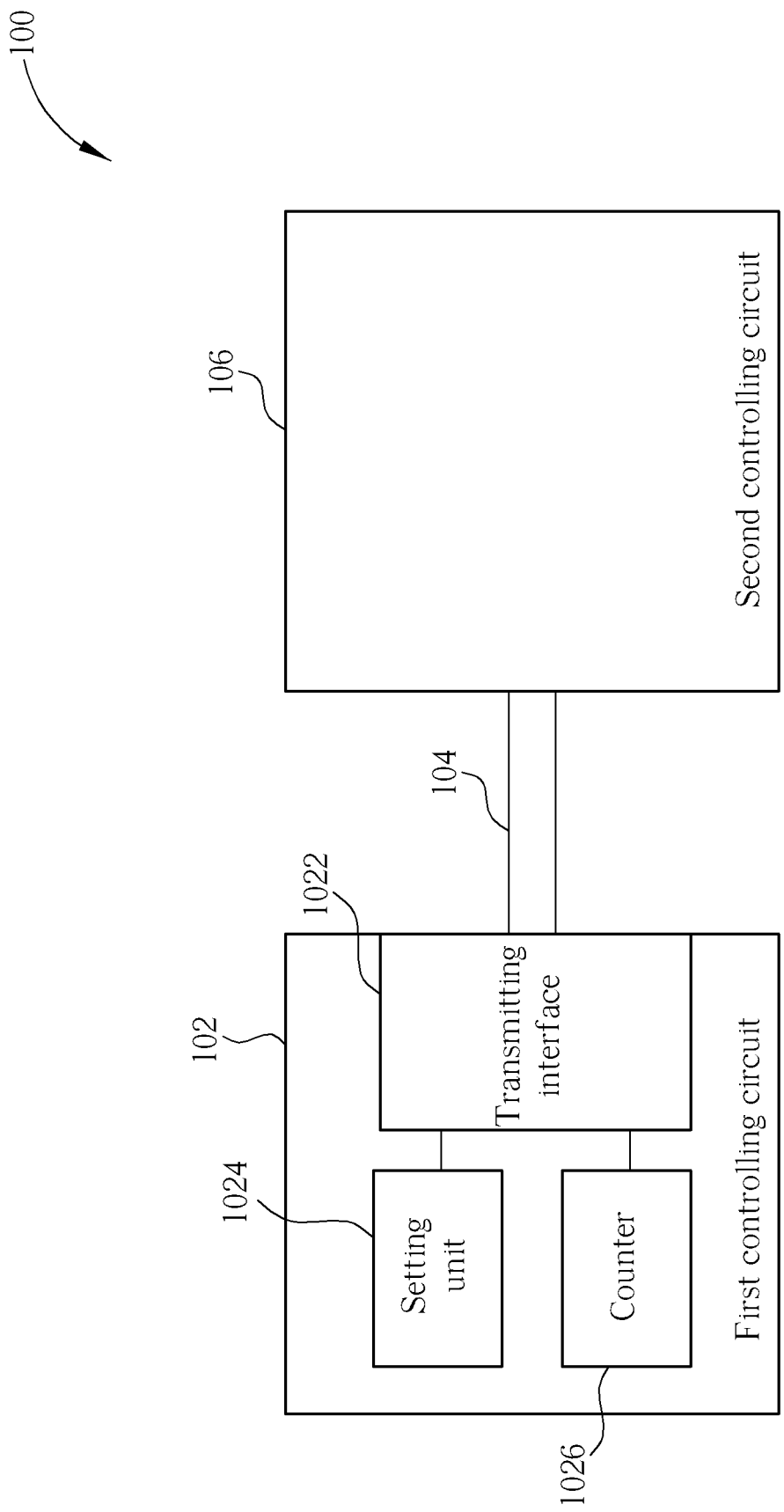
FIG. 1 is a diagram illustrating a signal transmitting system according to an embodiment of the disclosure.

Please refer to FIG. 1. FIG. 1 is a diagram illustrating a signal transmitting system 100 according to an embodiment of the disclosure. The signal transmitting system 100 comprises a first controlling circuit 102, a data transmitting medium 104, and a second controlling circuit 106, wherein the first controlling circuit 102 supports a power saving mechanism but does not support an Auto-negotiation (NWAY) mechanism, and the second controlling circuit 106 connects to the first controlling circuit 102 via the data transmitting medium 104. In this embodiment, the power saving mechanism conforms to the Institute of Electrical and Electronics Engineers (IEEE) 802.3az Energy Efficient Ethernet (EEE) standards. When the power saving mechanism of the IEEE 802.3az EEE is installed to a controlling circuit, the installation should comply with the Auto-negotiation mechanism established by the Institute of Electrical and Electronics Engineers. In other words, according to the standard established by the Institute of Electrical and Electronics Engineers, a controlling circuit that does not support the Auto-negotiation mechanism is unable to perform the power saving mechanism. Thus, one of the objectives of the exemplary embodiment is to make the controlling circuit that does not support the Auto-negotiation mechanism able to perform the power saving mechanism. More specifically, one of the features of the disclosure is forcing installation of the power saving mechanism that conforms to IEEE 802.3az EEE standard in the first controlling circuit 102 and second controlling circuit 106 to make sure that both circuits 102, 106 can support the same power saving mechanism. To reach the above mentioned objectives, at least one of the controlling circuits in the signal transmitting system 100 should first support the power saving mechanism of the 802.3az EEE standard, and the other controlling circuit may or may not support the power saving mechanism. In this exemplary embodiment, the following paragraphs focus on how to force installation of the power saving mechanism conforming to 802.3az EEE standard in the first controlling circuit 102 and the second controlling circuit 106.

The first controlling circuit 102 comprises a first transmitting interface 1022, a setting unit 1024, and a counter 1026. The transmitting interface 1022 is arranged to couple a specific controlling circuit (i.e., the second controlling circuit 106 in this embodiment) to the first controlling circuit 102 to perform the signal transmission. The setting unit 1024 is coupled to the transmitting interface 1022 to control the second controlling circuit 106 to operate in the power saving mechanism. The counter 1026 is arranged to count a number of times of off-link between the first controlling circuit 102 and the second controlling circuit 106 after the setting unit 1024 forces the second controlling circuit 106 to operate in the power saving mechanism, wherein the setting unit 1024 further decides whether to disable the power saving mechanism or not according to the number of times off-link occurs.

Normally, when the first controlling circuit 102 of the signal transmitting system 100 is coupled to the second controlling circuit 106 via the data transmitting medium 104, two kinds of linking states may be established. One is the state before the link is established successfully, and the other is the state after the link is established successfully. According to the disclosure, the setting unit 1024 is capable of controlling the second controlling circuit 106 to operate in the power saving mechanism before or after the link is established between the first controlling circuit 102 and the second controlling circuit 106.

According to the first embodiment of the disclosure, after the first controlling circuit 102 and the second controlling circuit 106 are linked, the setting unit 1024 directly controls the transmitting interface 1022 of the first controlling circuit 102 to force performance of the power saving mechanism. According to the specifications of 802.3az EEE standard, after the first controlling circuit 102 and the second controlling circuit 106 are linked, and when the data transmission rate between the first controlling circuit 102 and the second controlling circuit 106 is 10 MB/s (Mega Byte per second), the data transmission rate between the first controlling circuit 102 and the second controlling circuit 106 can be kept in 10 MB/s after the first controlling circuit 102 is forced to perform the power saving mechanism regardless of whether the second controlling circuit 106 supports the power saving mechanism or not. Accordingly, the first controlling circuit 102 can communicate with the second controlling circuit 106 at the data rate of 10 MB/s while operating in the power saving mode.

When the first controlling circuit 102 is linked to the second controlling circuit 106, if the data transmission rate between the first controlling circuit 102 and the second controlling circuit 106 is 100 MB/s, and if the first controlling circuit 102 is forced to perform the power saving mechanism, the first controlling circuit 102 will be off-linked with the second controlling circuit 106. In addition, the counter 1026 is arranged to count a number of times of off-link occurring between the first controlling circuit 102 and the second controlling circuit 106 when the first controlling circuit 102 is forced to perform the power saving mechanism. More specifically, each time the first controlling circuit 102 is forced to perform the power saving mechanism and the off-link between the first controlling circuit 102 and the second controlling circuit 106 occurs, the counter 1026 counts one. If the number of times of off-link reaches a predetermined number (e.g., three times), the setting unit 1024 stops forcing the first controlling circuit 102 to perform the power saving mechanism, and determines that the second controlling circuit 106 does not support the power saving mechanism.

According to the second embodiment, the setting unit 1024 and the second controlling circuit 106 exchange power saving mechanism related information with each other after the first controlling circuit 102 and the second controlling circuit 106 are linked. When the setting unit 1024 exchanges the power saving mechanism related information with the second controlling circuit 106 successfully, the setting unit 1024 controls the transmitting interface 1022 to operate the power saving mechanism according to the power saving mechanism related information of the second controlling circuit 106. More specifically, when the first controlling circuit 102 is linked to the second controlling circuit 106, the transmitting interface 1022 of the first controlling circuit 102 communicates with the second controlling circuit 106 via data packets. Therefore, when the first controlling circuit 102 is linked to the second controlling circuit 106, the transmitting interface 1022 of the first controlling circuit 102 generates a triggering signal using data packets to the second controlling circuit 106 via the transmitting interface 1022. Then, if the second controlling circuit 106 supports the power saving mechanism of 802.3az EEE standard, the second controlling circuit 106 will send back a corresponding feedback signal in the form of data packets to the first controlling circuit 102. At this point, the first controlling circuit 102 starts to exchange the power saving mechanism related information with the second controlling circuit 106. Please note that, after the first controlling circuit 102 is linked to the second controlling circuit 106, the disclosure is not limited to exchanging the power saving mechanism related information in a predetermined time interval during the time when the communication protocol is executed. In this embodiment, the transmitting interface 1022 performs the exchange of the power saving mechanism related information when the first controlling circuit 102 exchanges a remote-control communication protocol with the second controlling circuit 106. In another embodiment, the transmitting interface 1022 performs the exchange of the power saving mechanism related information when the first controlling circuit 102 exchanges a Link Layer Discovery Protocol (LLDP) with the second controlling circuit 106.

According to a third embodiment, the setting unit 1024 and the second controlling circuit 106 exchange power saving mechanism related information before the first controlling circuit 102 and the second controlling circuit 106 are linked. When the setting unit 1024 exchanges the power saving mechanism related information with the second controlling circuit 106 successfully, the setting unit 1024 controls the transmitting interface 1022 to operate the power saving mechanism according to the power saving mechanism related information of the second controlling circuit 106. Please note that, in this embodiment, the first controlling circuit 102 and the second controlling circuit 106 can be High-Definition Multimedia Interface (HDMI) controlling circuits. In the first HDMI controlling circuit (i.e., the first controlling circuit 102), the setting unit 1024 may exchange the power saving mechanism related information with the second controlling circuit 106 via the communication protocol defined in the Consumer Electronics Control (CEC) channel. More specifically, in this exemplary embodiment, before the first controlling circuit 102 is linked to the second controlling circuit 106, the setting unit 1024 of the first controlling circuit 102 uses the CEC channel to transmit a triggering signal conforming to the power saving mechanism of the 802.3az EEE to the second controlling circuit 106 via the data transmitting medium 104. If the second controlling circuit 106 also supports the power saving mechanism of the 802.3az EEE, the second controlling circuit 106 sends back a corresponding feedback signal to the first controlling circuit 102. The first controlling circuit 102 then starts exchanging the power saving mechanism related information with the second controlling circuit 106.

A fourth embodiment comprises features relating to a combination of the above second embodiment and the first embodiment. In this embodiment, when the first controlling circuit 102 is linked to the second controlling circuit 106, the setting unit 1024 controls the transmitting interface 1022 to first exchange the power saving mechanism related information with the second controlling circuit 106 to attempt to exchange the power saving mechanism related information with the second controlling circuit 106 via data packets. If the first controlling circuit 102 fails to exchange the power saving mechanism related information with the second controlling circuit 106, the setting unit 1024 forces the transmitting interface 1022 to perform the power saving mechanism. In other words, this embodiment will first perform the method of the above second embodiment, and then selectively perform the method of the above first embodiment according to the result of the first method. Those skilled in this art should easily understand the detailed operation of the fourth embodiment after reading the disclosures of the first and second embodiments, thus the detailed description is omitted here for brevity.

A fifth embodiment comprises features related to a combination of the above third embodiment and the first embodiment. In this embodiment, before the first controlling circuit 102 is linked to the second controlling circuit 106, the setting unit 1024 controls the transmitting interface 1022 to use the communication protocol defined in the CEC channel to exchange the power saving mechanism related information with the second controlling circuit 106. If the first controlling circuit 102 fails to exchange the power saving mechanism related information with the second controlling circuit 106, the setting unit 1024 controls the transmitting interface 1022 to temporarily stop exchange of the power saving mechanism related information with the second controlling circuit 106. Then, after the first controlling circuit 102 is linked to the second controlling circuit 106, the setting unit 1024 forces the transmitting interface 1022 to perform the power saving mechanism. In other words, this embodiment will first perform the method of the above third embodiment, and then selectively perform the method of the above first embodiment according to the result of the first method. Those skilled in this art should easily understand the detailed operation of the fifth embodiment after reading the disclosures of the first and third embodiments, thus the detailed description is omitted here for brevity.

A sixth embodiment comprises features related to a combination of the above third embodiment, the second embodiment, and the first embodiment. In this embodiment, before the first controlling circuit 102 is linked to the second controlling circuit 106, the setting unit 1024 controls the transmitting interface 1022 to use the communication protocol defined in the CEC channel to exchange the power saving mechanism related information with the second controlling circuit 106. If the first controlling circuit 102 fails to exchange the power saving mechanism related information with the second controlling circuit 106, the setting unit 1024 controls the transmitting interface 1022 to temporarily stop exchange of the power saving mechanism related information with the second controlling circuit 106. Then, after the first controlling circuit 102 is linked to the second controlling circuit 106, the setting unit 1024 forces the transmitting interface 1022 to attempt to exchange the power saving mechanism related information with the second controlling circuit 106 via data packets. If the first controlling circuit 102 fails to exchange the power saving mechanism related information with the second controlling circuit 106, the setting unit 1024 forces the transmitting interface 1022 to perform the power saving mechanism to attempt to install the power saving mechanism conforming the 802.3az EEE in the second controlling circuit 106. Those skilled in this art should easily understand the detailed operation of the sixth embodiment after reading the disclosures of the first, second, and third embodiments, thus the detailed description is omitted here for brevity.

Figure 2:
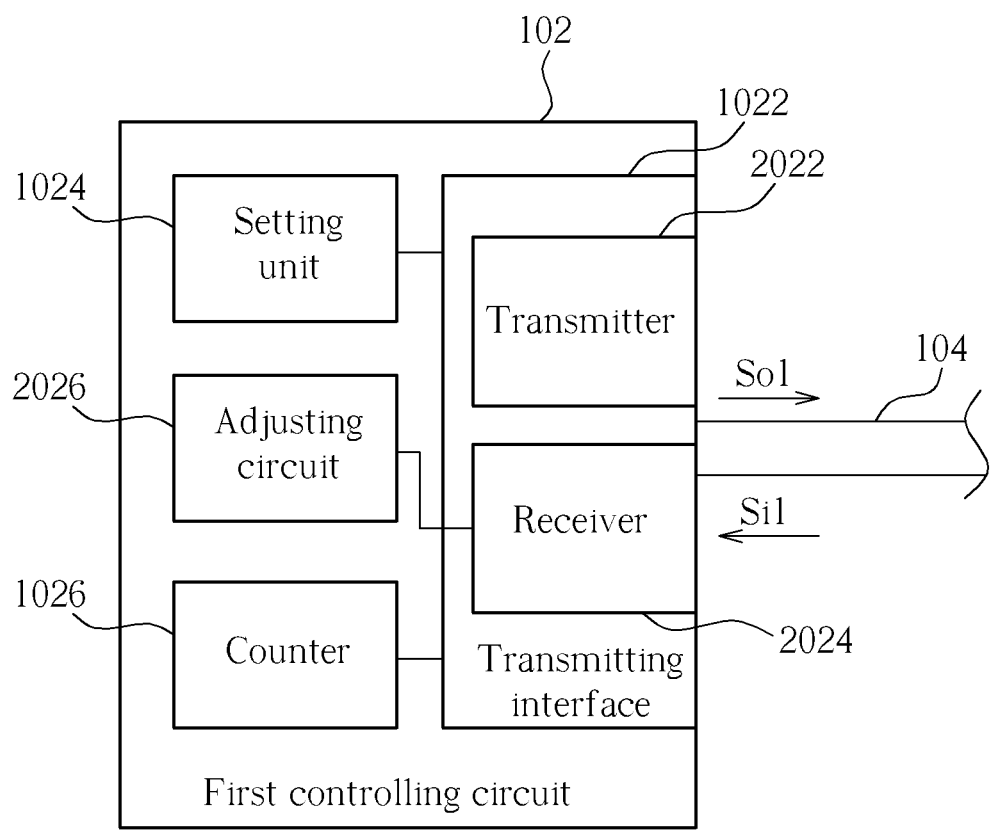
FIG. 2 is a diagram illustrating a first controlling circuit having the ability of preventing the erroneous wake-up from a low power consumption mode caused by an echo according to an embodiment of the disclosure.

In addition, in the above-mentioned embodiments, if the first controlling circuit 102 installs the power saving mechanism conforming to the 802.3az EEE in the second controlling circuit 106 successfully, if both the first controlling circuit 102 and the second controlling circuit 106 are operated in Low Power Idle (LPI) (e.g., a sleep mode), and if the first controlling circuit 102 attempts to wake up the second controlling circuit 106 from the sleep mode, a transmitter of the first controlling circuit 102 generates a triggering signal to a receiver of the second controlling circuit 106 via a transmitting interface 1022 to wake up the second controlling circuit 106 from the sleep mode. Then, to prevent the receiver of the first controlling circuit 102 being erroneously woken up by an echo caused by the triggering signal, another embodiment (i.e., the seventh embodiment) is provided to improve the effect caused by the echo in the signal transmitting system 100, as shown in FIG. 2. The effect caused by the echo can be serious when the controlling circuit 102 and the second controlling circuit 106 are HDMI controlling circuits. This is because the HDMI controlling circuit 102 and the HDMI controlling circuit 106 use the same transmission line (e.g., the same transmission pair) to transmit and receive data. As a result, the receiver of the first controlling circuit 102 may be erroneously woken up by an echo when the transmitter of the first controlling circuit 102 transmits the triggering signal to the receiver of the second controlling circuit 106. The features of the embodiment disclosed in the following paragraphs are described as HDMI systems, but this is not a limitation of the disclosure.

Figure 3:
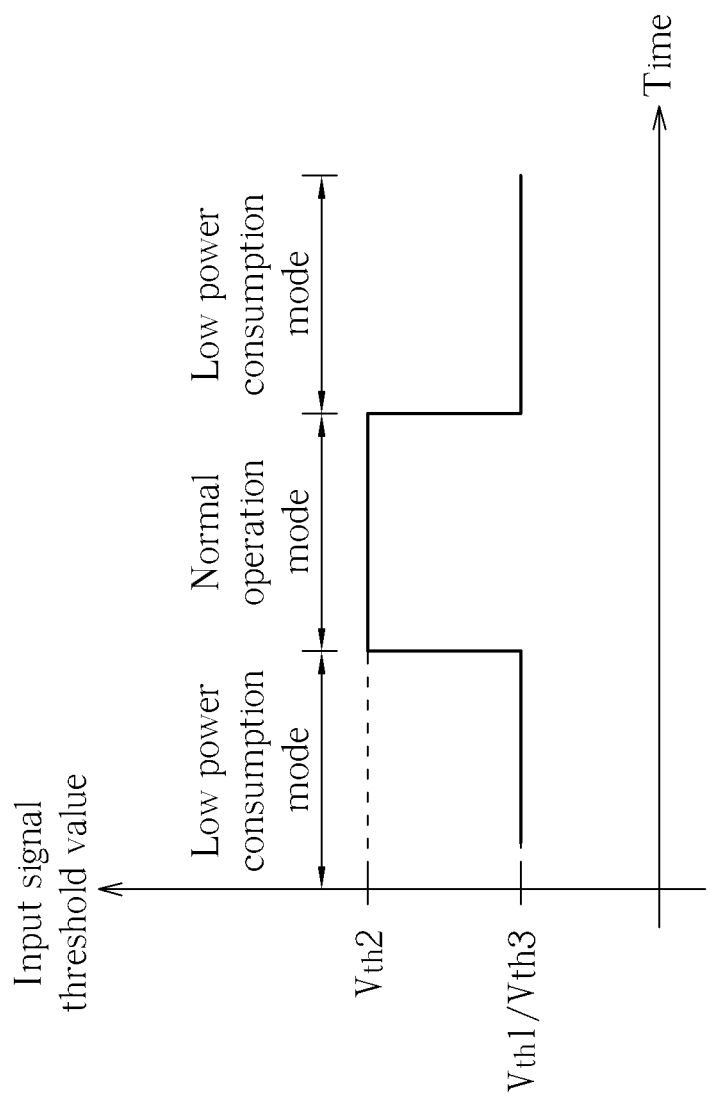
FIG. 3 is a diagram illustrating input signal thresholds of different operation modes of a receiver shown in FIG. 2.

FIG. 2 is a diagram illustrating the first controlling circuit 102 having the ability of preventing erroneous wake-up from a low power consumption mode (e.g., a sleep mode) caused by an echo according to a seventh embodiment of the disclosure. Please refer to the signal transmitting system 100 shown in FIG. 1 again. The first controlling circuit 102 in FIG. 2 further comprises a transmitter 2022, a receiver 2024, and an adjusting circuit 2026, wherein the transmitter 2022 and the receiver 2024 comprise the transmitting interface 1022, and the transmitter 2022 is arranged to transmit an output signal So1. The receiver 2024 is arranged to receive an input signal Si1. The adjusting circuit 2026 is coupled to the receiver 2024. When both the first controlling circuit 102 and the second controlling circuit 106 enter the low power consumption mode from a normal operation mode, the adjusting circuit 2026 adjusts an input signal threshold value of the receiver 2024 into a second threshold value Vth2 from a first threshold value Vth1, and when a signal strength of the input signal Si1 reaches the second threshold value Vth2, the receiver 2024 regards the input signal Si1 as a valid input signal. When both the first controlling circuit 102 and the second controlling circuit 106 enter the normal operation mode from the low power consumption mode, the adjusting circuit 2026 further adjusts the input signal threshold value into a third threshold value Vth3 from the second threshold value Vth2, and when the signal strength of the input signal Si1 reaches the third threshold value Vth3, the first controlling circuit 102 regards the input signal Si1 as a valid input signal, as shown in FIG. 3. FIG. 3 is a diagram illustrating the input signal thresholds of different operation modes of the receiver 2024 shown in FIG. 2. Please note that, in this embodiment, the third threshold value Vth3 is set to be substantially equal to the first threshold value Vth1, but this is not a limitation of the disclosure. The third threshold value Vth3 can be set to be larger or smaller than the first threshold value Vth1.

When the first controlling circuit 102 enters the low power consumption mode, the receiver 2024 is also in the low power consumption mode (e.g., the sleep mode), meaning the receiver 2024 of the controlling circuit 102 does not receive any input signal. To avoid the receiver 2024 of the first controlling circuit 102 being erroneously woken up by an echo caused by the triggering signal, the adjusting circuit 2026 increases the input signal threshold value to the second threshold value Vth2 from the first threshold value Vth1 when both the first controlling circuit 102 and the second controlling circuit 106 enter the low power consumption mode, wherein the second threshold value Vth2 corresponds to the low power consumption mode, and the first threshold value Vth1 corresponds to the normal operation mode. The second threshold value Vth2 is set to be higher than the signal strength of the echo. Therefore, when the transmitter 2022 of the controlling circuit 102 transmits the triggering signal to the second controlling circuit 106, the receiver 2024 of the first controlling circuit 102 will not be erroneously woken up by the echo caused by the triggering signal.

Furthermore, when the receiver 2024 of the first controlling circuit 102 enters the normal operation mode to receive a normal input signal Si1, the adjusting circuit 2026 further decreases the input signal threshold value to a third threshold value Vth3 (e.g., the first threshold value Vth1) from the second threshold value Vth2. The input signal Si1 can then be determined as a valid input signal of the receiver 2024 when the signal strength of the input signal Si1 reaches the first threshold value Vth1.

Briefly, the features of the seventh embodiment can be simplified as the following steps:

Step 201: Link the first controlling circuit 102 to the second controlling circuit 106;

Step 202: Receive the input signal Si1 from the second controlling circuit 106;

Step 203: When both the first controlling circuit 102 and the second controlling circuit 106 enter the low power consumption mode, increase the input signal threshold value of the receiver 2024 to the second threshold value Vth2 from the first threshold value Vth1, and when the signal strength of the input signal Si1 reaches the second threshold value Vth2, arrange the receiver 2024 to regard the input signal Si1 as a valid input signal;

Step 204: When the receiver 2024 of the first controlling circuit 102 enters the normal operation mode to receive the normal input signal Si1, decrease the input signal threshold value of the receiver 2024 to a third threshold value Vth3 (e.g., the first threshold value Vth1) from the second threshold value Vth2, and when the signal strength of the input signal Si1 reaches the third threshold value Vth3, arrange the receiver 2024 to regard the input signal Si1 as a valid input signal.

Figure 4:
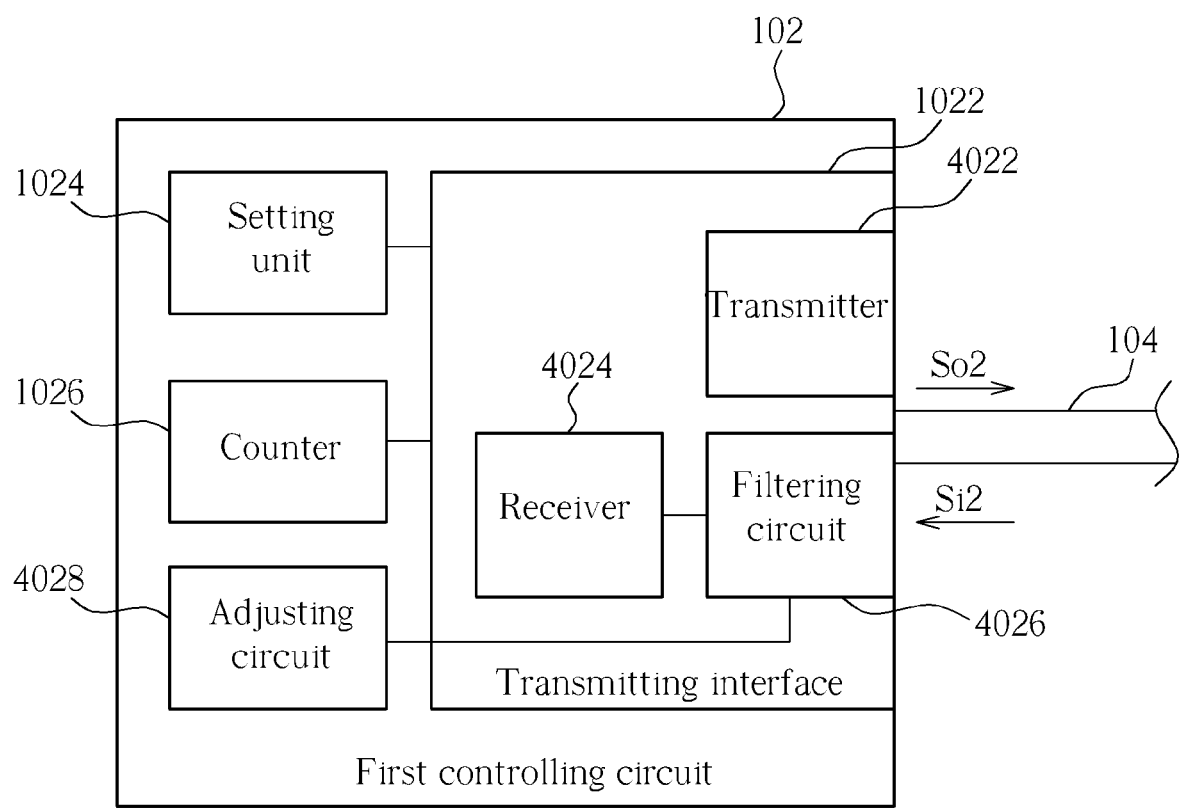
FIG. 4 is a diagram illustrating a first controlling circuit having the ability of preventing the erroneous wake-up from a low power consumption mode caused by an echo according to an embodiment of the disclosure.
Figure 5:
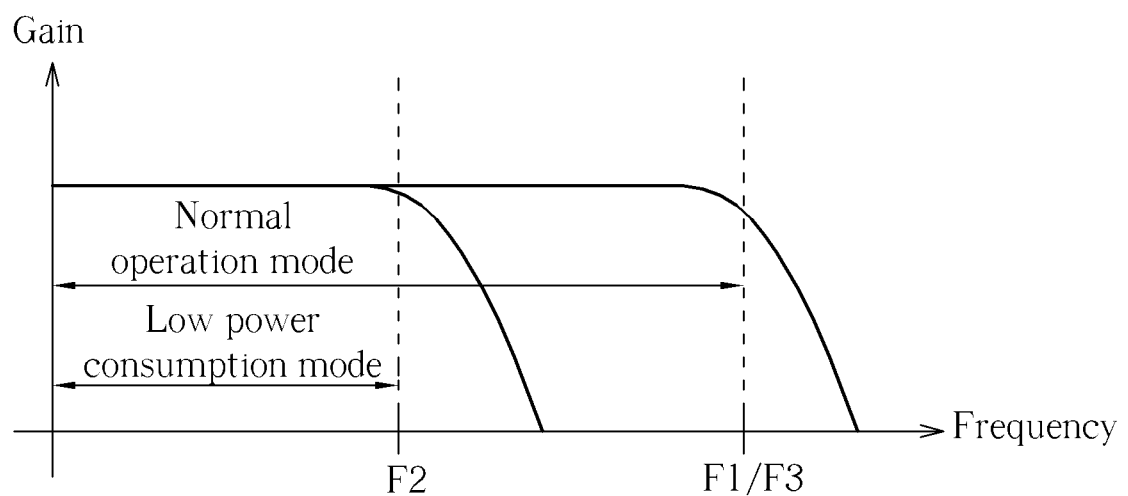
FIG. 5 is a frequency response illustrating cut-off frequencies corresponding to different operating modes of a filtering circuit as shown in FIG. 4.

Please refer to FIG. 4. FIG. 4 is a diagram illustrating the first controlling circuit 102 having the ability of preventing the erroneous wake-up from a low power consumption mode (e.g., a sleep mode) caused by an echo according to an eighth embodiment of the disclosure. The first controlling circuit 102 further comprises a transmitter 4022, a receiver 4024, a filtering circuit 4026, and an adjusting circuit 4028. The transmitter 4022 is arranged to transmit an output signal So2. The receiver 4024 is arranged to receive an input signal Si2. The filtering circuit 4026 is coupled to the receiver 4024, and arranged to perform a filtering operation upon the input signal Si2 received by the first controlling circuit 102. The adjusting circuit 4028 is coupled to the filtering circuit 4026, and arranged to adjust a cut-off frequency of the filtering circuit 4026 to a second threshold frequency F2 from a first threshold frequency F1 before both the first controlling circuit 102 and the second controlling circuit 106 enter a low power consumption mode from a normal operation mode. When a signal frequency of the input signal Si2 is lower than the second threshold frequency F2, the first controlling circuit 102 regards the input signal Si2 as a valid input signal. When both the first controlling circuit 102 and the second controlling circuit 106 enter the normal operation mode from the low power consumption mode, the adjusting circuit 4028 further adjusts the cut-off frequency to a third threshold frequency F3 from the second threshold frequency F2, and when the signal frequency of the input signal Si2 is lower than the third threshold frequency F3, the first controlling circuit 102 regards the input signal Si2 as a valid input signal as shown in FIG. 5. FIG. 5 is a frequency response illustrating the cut-off frequencies corresponding to different operating modes of the filtering circuit 4026 as shown in FIG. 4. Please note that, in this embodiment, the third threshold frequency F3 is set to be substantially equal to the first threshold frequency F1, but this is not a limitation of the disclosure. The third threshold frequency F3 can be set to be larger or smaller than the first threshold frequency F1.

Normally, the frequency of an echo is higher than the frequency of the normal input signal Si2, thus when the first controlling circuit 102 enters the low power consumption mode from the normal operation mode, the adjusting circuit 4028 decreases the cut-off frequency of the filtering circuit 4026 to the second threshold frequency F2 from the first threshold frequency F1 to effectively filter out the high frequency echo caused by the triggering signal. In this embodiment, the second threshold frequency F2 is lower than the frequency of the echo, thus when the transmitter 2022 of the first controlling circuit 102 transmits the triggering signal to the second controlling circuit 106, the echo will be filtered out by the filtering circuit 4026 and will not erroneously wake up the receiver 2024 of the first controlling circuit 102.

In addition, when the receiver 2024 of the first controlling circuit 102 enters the normal operation mode from the low power consumption mode to receive a normal input signal Si2, the adjusting circuit 4028 further increases the cut-off frequency of the filtering circuit 4026 to the threshold frequency F3 (e.g., the first threshold frequency F1) from the second threshold frequency F2. The input signal Si2 can pass through the filtering circuit 4026 once the frequency of the input signal Si2 is lower than the first threshold frequency F1, and the receiver 2024 regards the input signal Si2 as a valid input signal.

Briefly, the features of the eighth embodiment can be simplified as the following steps:

Step 401: Link the first controlling circuit 102 to the second controlling circuit 106;

Step 402: Arrange the filtering circuit 4026 to perform a filtering operation upon the input signal Si2 received by the first controlling circuit 102, wherein the input signal Si2 is generated from the second controlling circuit 106;

Step 403: Before both the first controlling circuit 102 and the second controlling circuit 106 enter the low power consumption mode, decrease the cut-off frequency of the filtering circuit 4026 to the second threshold frequency F2 from the first threshold frequency F1, and when the signal frequency of the input signal Si2 is lower than the second threshold frequency F2, arrange the first controlling circuit 102 to regard the input signal Si2 as a value input signal;

Step 403: When the receiver 2024 of the first controlling circuit 102 enters the normal operation mode from the low power consumption mode to receive a normal input signal Si2, increase the cut-off frequency of the filtering circuit 4026 to the third threshold frequency F3 (e.g., the first threshold frequency F1) from the second threshold frequency F2, and when the frequency of the input signal Si2 is lower than the first threshold frequency F1, arrange the receiver 2024 to regard the input signal Si2 as a valid input signal.

Figure 6:
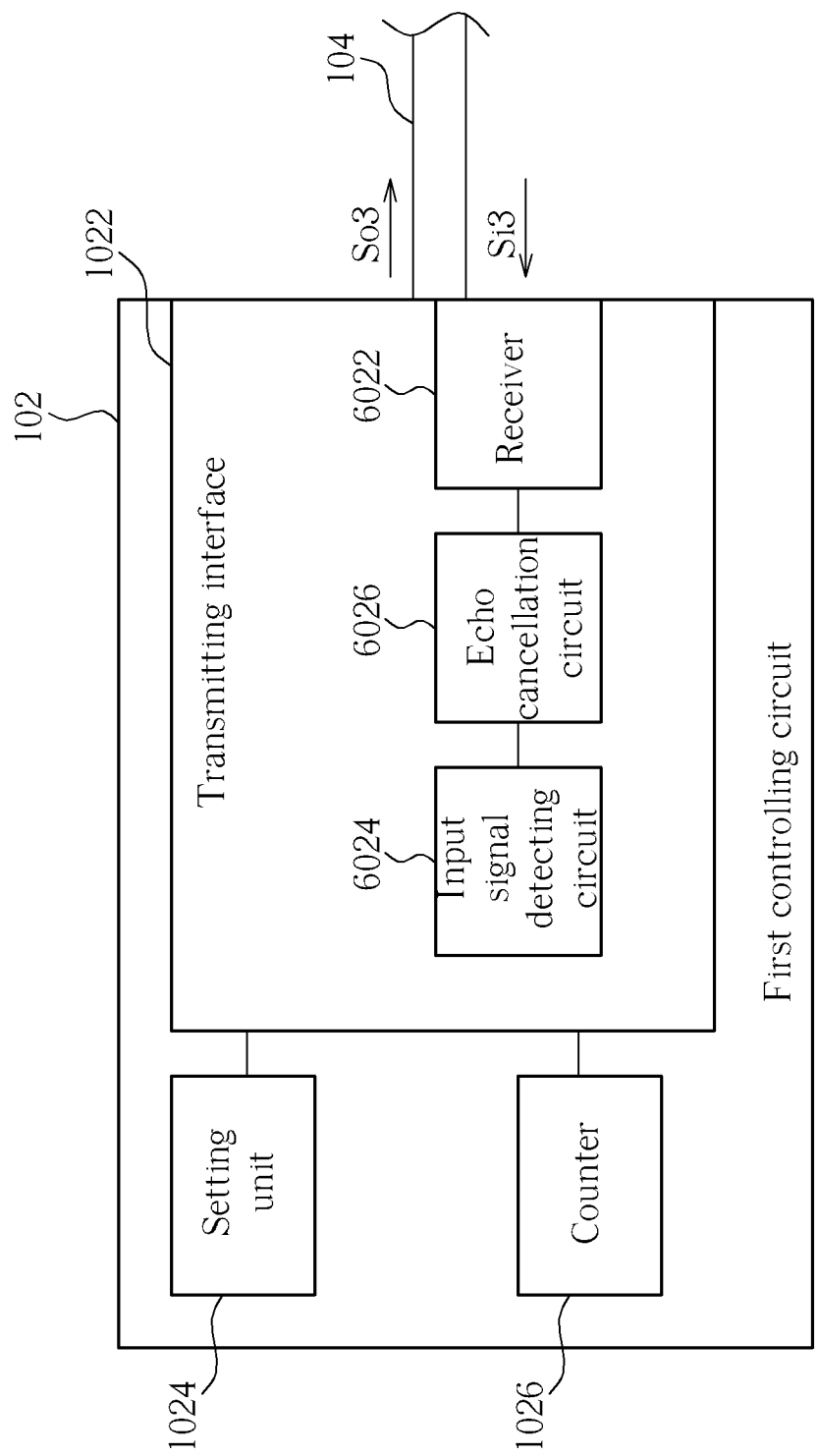
FIG. 6 is a diagram illustrating a first controlling circuit having the ability of preventing the erroneous wake-up from a low power consumption mode caused by an echo according to an embodiment of the disclosure.

Please refer to FIG. 6. FIG. 6 is a diagram illustrating the first controlling circuit 102 having the ability of preventing the erroneous wake up from a low power consumption mode (e.g., a sleep mode) caused by an echo according to a ninth embodiment of the disclosure. Please refer to the signal transmitting system 100 as shown in FIG. 1 again. The first controlling circuit 102 further comprises a receiver 6022, an input signal detecting circuit 6024, and an echo cancellation circuit 6026 (e.g., a digital echo cancellation circuit). The receiver 6022 is arranged to receive an input signal Si3. The input signal detecting circuit 6024 is arranged to detect if the input signal Si3 is a valid input signal. The echo cancellation circuit 6026 is coupled between the receiver 6022 and the input signal detecting circuit 6024 for performing an echo cancellation operation, wherein the input signal detecting circuit 6024 first performs the echo cancellation operation upon the input signal Si3, and then transmits the input signal Si3 after performing the echo cancellation operation on the input signal detecting circuit 6024. Therefore, when both the first controlling circuit 102 and the second controlling circuit 106 enter the low power consumption mode, and if the first controlling circuit 102 generates a triggering signal to the second controlling circuit 106 to wake up the second controlling circuit 106, then the echo caused by the triggering signal will be cancelled by the echo cancellation circuit 6026 before being inputted to the receiver 6022. Accordingly, the echo caused by the triggering signal will not erroneously wake up the receiver 6022 of the first controlling circuit 102.

Briefly, the features of the ninth embodiment can be simplified as the following steps:

Step 601: Link the first controlling circuit 102 to the second controlling circuit 106;

Step 602: Receive the input signal Si3;

Step 603: Arrange the echo cancellation circuit 6026 to perform an echo cancellation operation upon the input signal Si3;

Step 604: Determine if the input signal Si3 after performing the echo cancellation operation is a valid input signal.

Figure 7:
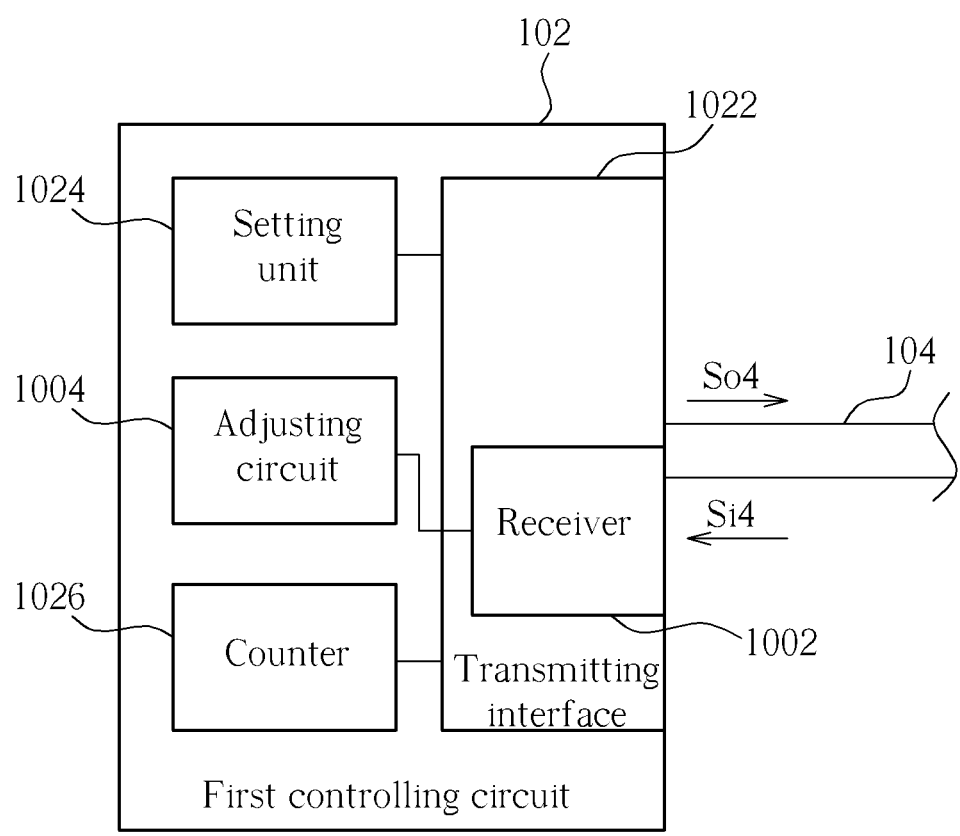
FIG. 7 is a diagram illustrating a first controlling circuit having the ability of preventing the erroneous wake-up from a low power consumption mode caused by an echo according to an embodiment of the disclosure.

Please refer to FIG. 7. FIG. 7 is a diagram illustrating the first controlling circuit 102 having the ability of preventing the erroneous wake-up from a low power consumption mode (e.g., a sleep mode) caused by an echo according to a tenth embodiment of the disclosure. Please refer to the signal transmitting system 100 as shown in FIG. 1 again. The first controlling circuit 102 further comprises a receiver 1002 and a determining circuit 1004. The receiver 1002 is arranged to receive an input signal Si4. The determining circuit 1004 is coupled to the receiver 1002 for determining if a signal frequency of the input signal Si4 reaches a predetermined frequency, wherein when the signal frequency does not reach the predetermined frequency, the determining circuit 1004 determines that the input signal Si4 is a valid input signal, and when the signal frequency reaches the predetermined frequency, the determining circuit 1004 determines that the input signal Si4 is not a valid input signal. Normally, the frequency of an echo is higher than the frequency of the normal input signal Si4, and the frequency of the input signal Si4 always lies in a predetermined frequency range. If the frequency of the first input signal Si4 is higher than the predetermined frequency range, meaning that the frequency of the input signal Si4 reaches the predetermined frequency (where the predetermined frequency can be set as an upper limit of the predetermined frequency range), then the determining circuit 1004 determines that the input signal Si4 is not a valid input signal. If the frequency of the input signal Si4 lies within the predetermined frequency range, meaning that the frequency of the input signal Si4 does not reach the predetermined frequency (i.e., the upper limit of the predetermined frequency range), then the determining circuit 1004 determines that the input signal Si4 is a valid input signal. Accordingly, the input signal Si4 can be determined as a valid input signal or invalid input signal according to the frequency of the input signal Si4. When the input signal Si4 is determined as a valid input signal, the receiver 6022 of the first controlling circuit 102 will be woken up. Otherwise, the receiver 6022 of the first controlling circuit 102 will be kept in the low power consumption mode. Therefore, the erroneous wake-up problem of the receiver 6022 of the first controlling circuit 102 is solved.

Briefly, the features of the tenth embodiment can be simplified as the following steps:

Step 701: Link the first controlling circuit 102 to the second controlling circuit 106;

Step 702: Receive the input signal Si4;

Step 703: Determine if the signal frequency of the input signal Si4 is higher than the predetermined frequency, wherein if the signal frequency is higher than the predetermined frequency, go to Step 704, and if the signal frequency is not higher than the predetermined frequency, go to Step 705;

Step 704: Determine that the input signal Si4 is a valid input signal;

Step 705: Determine that the input signal Si4 is not a valid input signal.

Briefly, the embodiments of the disclosure forces installation of the power saving mechanism conforming to the 802.3az EEE standard in the first controlling circuit 102 and the second controlling circuit 106 located on both sides of the signal transmitting system 100 to make both the first controlling circuit 102 and the second controlling circuit 106 support the same power saving mechanism. In addition, when the first controlling circuit 102 installs the power saving mechanism conforming to the 802.3az EEE standard in the second controlling circuit 106 successfully, and when both the first controlling circuit 102 and the second controlling circuit 106 are in the low power consumption mode, the other embodiments prevent a receiver of the first controlling circuit 102 from erroneously being woken up by an echo if the first controlling circuit 102 goes to wake up the second controlling circuit 106 from the sleeping mode.

Those skilled in the art will readily observe that numerous modifications and alterations of the device and method may be made while retaining the teachings of the invention.

What is claimed is:

1. A controlling circuit with a power saving mechanism, comprising:

a transmitting interface, arranged to perform a signal transmission with a specific controlling circuit;

a setting unit, coupled to the transmitting interface, arranged to control the specific controlling circuit to operate in the power saving mechanism; and a counter, arranged to count a number of times off-link occurs between the controlling circuit and the specific controlling circuit after the setting unit forces the transmitting interface to perform the power saving mechanism;

wherein the controlling circuit has no Auto-negotiation (NWAY) mechanism; after the transmitting interface links to the specific controlling circuit, the setting unit further forces the transmitting interface to perform the power saving mechanism; and the setting unit further decides whether to disable the power saving mechanism or not according to the number of times off-link occurs, and when the number of times off-link occurs reaches a predetermined number, the setting unit disables the power saving mechanism.

2. The controlling circuit of claim 1, wherein the power saving mechanism conforms to IEEE 802.3az Energy Efficient Ethernet Standard.

3. The controlling circuit of claim 1, wherein the controlling circuit is a High-Definition Multimedia Interface (HDMI) controlling circuit.

4. A controlling circuit with a power saving mechanism, comprising:

a transmitting interface, arranged to perform a signal transmission with a specific controlling circuit; and a setting unit, coupled to the transmitting interface, arranged to control the specific controlling circuit to operate in the power saving mechanism;

wherein after the transmitting interface and the specific controlling circuit are linked with each other, the setting unit and the specific controlling circuit exchange a power saving mechanism related information with each other, and if the setting unit and the specific controlling circuit successfully exchange the power saving mechanism related information, the setting unit controls the transmitting interface to operate in the power saving mechanism according to the power saving mechanism related information of the specific controlling circuit; and after the transmitting interface and the specific controlling circuit are linked with each other, and if the setting unit and the specific controlling circuit fail to exchange the power saving mechanism related information, the setting unit further forces the transmitting interface to perform the power saving mechanism.

5. A controlling circuit with a power saving mechanism, comprising:

a transmitting interface, arranged to perform a signal transmission with a specific controlling circuit; and a setting unit, coupled to the transmitting interface, arranged to control the specific controlling circuit to operate in the power saving mechanism;

wherein before the transmitting interface and the specific controlling circuit are linked with each other, the setting unit and the specific controlling circuit exchange a power saving mechanism related information with each other, and if the setting unit and the specific controlling circuit successfully exchange the power saving mechanism related information, the setting unit controls the transmitting interface to operate in the power saving mechanism according to the power saving mechanism related information of the specific controlling circuit.

6. The controlling circuit of claim 5, wherein if the setting unit and the specific controlling circuit fail to exchange the power saving mechanism related information with each other before the transmitting interface and the specific controlling circuit are linked with each other, the setting unit further forces the transmitting interface to perform the power saving mechanism.

7. The controlling circuit of claim 5, wherein the setting unit and specific controlling circuit exchange the power saving mechanism related information with each other via a Consumer Electronics Control (CEC) channel.

8. The controlling circuit of claim 5, wherein if the setting unit and the specific controlling circuit fail to exchange the power saving mechanism related information with each other before the transmitting interface and the specific controlling circuit are linked with each other, the setting unit further exchanges the power saving mechanism related information with the specific controlling circuit after the transmitting interface and the specific controlling circuit are linked with each other, and if the setting unit and the specific controlling circuit successfully exchange the power saving mechanism related information with each other, the setting unit controls the transmitting interface to operate in the power saving mechanism according to the power saving mechanism related information of the specific controlling circuit.

9. The controlling circuit of claim 8, wherein if the setting unit and the specific controlling circuit fail to exchange the power saving mechanism related information with each other after the transmitting interface and the specific controlling circuit are linked with each other, the setting unit further forces the transmitting interface to perform the power saving mechanism.

* * * * *